US010232874B2

(12) United States Patent
Maeshima

(10) Patent No.: US 10,232,874 B2
(45) Date of Patent: Mar. 19, 2019

(54) MOTOR DRIVE DEVICE AND ELECTRIC POWER STEERING DEVICE

(71) Applicant: Nidec Corporation, Kyoto (JP)

(72) Inventor: Osamu Maeshima, Kawasaki (JP)

(73) Assignee: Nidec Corporation, Kyoto (JP)

( * ) Notice: Subject to any disclaimer, the term of this patent is extended or adjusted under 35 U.S.C. 154(b) by 79 days.

(21) Appl. No.: 15/523,738

(22) PCT Filed: Nov. 4, 2015

(86) PCT No.: PCT/JP2015/081086
§ 371 (c)(1),
(2) Date: May 2, 2017

(87) PCT Pub. No.: WO2016/072432
PCT Pub. Date: May 12, 2016

(65) Prior Publication Data
US 2017/0349207 A1    Dec. 7, 2017

(30) Foreign Application Priority Data

Nov. 5, 2014   (JP) ................................. 2014-224985
Feb. 27, 2015   (JP) ................................. 2015-039409

(51) Int. Cl.
*B60L 3/00* (2006.01)
*B62D 5/04* (2006.01)
(Continued)

(52) U.S. Cl.
CPC ............ *B62D 5/0484* (2013.01); *B60L 3/003* (2013.01); *B60L 3/0061* (2013.01); *B60L 3/0092* (2013.01);
(Continued)

(58) Field of Classification Search
CPC ...... B60L 3/003; B60L 3/0061; B60L 3/0092; B62D 5/046; B62D 5/0463; B62D 5/0487;
(Continued)

(56) References Cited

U.S. PATENT DOCUMENTS

2011/0156629 A1   6/2011   Satou et al.
2016/0039290 A1   2/2016   Mihara et al.

FOREIGN PATENT DOCUMENTS

JP   2009-005443 A      1/2009
JP   2009005443 A  *   1/2009
(Continued)

OTHER PUBLICATIONS

Official Communication issued in International Patent Application No. PCT/JP2015/081086 dated Dec. 8, 2015.

*Primary Examiner* — Maceeh Anwari
(74) *Attorney, Agent, or Firm* — Keating & Bennett, LLP

(57) ABSTRACT

A motor drive device includes a plurality of control systems that individually supply drive currents to a plurality of coil groups included in a motor. The motor drive device independently sets the current command values for the respective control systems. Based on the set current command values, drive instructions are supplied to drive circuits of inverters with respect to the respective control systems, thereby supplying drive currents from the inverters to the coil groups. The motor drive device detects a failure in any of the inverters and the coil groups with respect to each control system, and stops only the failed control system or causes only the failed control system to fall back. The motor drive device further includes a main computing device, and an auxiliary computing device. Consequently, if the auxiliary computing device is normal even in case the main
(Continued)

computing device fails, driving of the motor can be continued using one or some of the control systems.

13 Claims, 12 Drawing Sheets

(51) Int. Cl.
*H02H 7/08* (2006.01)
*H02P 6/08* (2016.01)
*H02P 6/12* (2006.01)
*H02H 7/122* (2006.01)
*H02P 25/22* (2006.01)
*H02P 27/06* (2006.01)
*H02P 29/024* (2016.01)

(52) U.S. Cl.
CPC .......... *B62D 5/046* (2013.01); *B62D 5/0463* (2013.01); *B62D 5/0487* (2013.01); *H02H 7/0838* (2013.01); *H02H 7/1225* (2013.01); *H02P 6/08* (2013.01); *H02P 6/12* (2013.01); *H02P 25/22* (2013.01); *H02P 27/06* (2013.01); *H02P 29/025* (2013.01); *H02P 29/027* (2013.01); *H02P 2205/05* (2013.01); *H02P 2207/05* (2013.01); *Y02T 10/642* (2013.01)

(58) Field of Classification Search
CPC ...... H02H 7/0838; H02H 7/1225; H02P 6/08; H02P 6/12; H02P 25/22; H02P 27/06; H02P 29/025; H02P 29/027
USPC ......................................................... 701/41
See application file for complete search history.

(56) References Cited

FOREIGN PATENT DOCUMENTS

| JP | 5370139 B2 | 12/2013 | |
| WO | 2014/167711 A1 | 10/2014 | |
| WO | WO-2014167711 A1 * | 10/2014 | ............. B60L 3/003 |

* cited by examiner

MOTOR DRIVE DEVICE AND ELECTRIC POWER STEERING DEVICE

BACKGROUND OF THE INVENTION

1. Field of the Invention

The present invention relates to a motor drive device and an electric power steering device.

2. Description of the Related Art

Conventionally, a transportation apparatus, such as an automobile, is mounted with an electric power steering device that assists a driver in steering. A conventional electric power steering device is described in Japanese Patent No. 5370139, for example. The electric power steering device in Japanese Patent No. 5370139 includes a plurality of inverters, and multiple sets of winding corresponding thereto (see Claim 1, paragraph 0016, etc.). Feedback control is then performed so that current corresponding to the command value can flow from the inverters to the multiple sets of winding. That is, the electric power steering device in Japanese Patent No. 5370139 causes multi-system drive circuits to drive a motor for assistance in the steering force of a driver.

SUMMARY OF THE INVENTION

In Japanese Patent No. 5370139, when an abnormality occurs in one of the multi-system drive circuits in the electric power steering device, a normal power converter continues supplying current to the corresponding winding. Thus, the assistance in the steering force of the driver can be continued (see paragraph 0007 etc.).

However, in Japanese Patent No. 5370139, the current command value set by the motor drive control device is the total value of currents supplied by the two inverters to the two sets of three-phase winding (see paragraph 0017 etc.). Consequently, in case an abnormality occurs in a certain system of drive circuit, feedback control based on an abnormal input value is performed until the motor drive control device recognizes the occurrence of the failure and takes measures. There is thus a possibility that in a normal system, an excessive current temporarily flows through the inverter and the winding, and causes an abnormal steering operation.

According to the structure of Japanese Patent No. 5370139, high rating components resistant to current overload described above are required to be adopted as the inverters and winding. This is one of factors that prevent the device from being reduced in size and cost.

Preferred embodiments of the present invention provide a motor drive device that can prevent the flow of excessive current through an inverter or a coil group in a normal control system due to the adverse effect of the failed control system.

Solution to Problem

An exemplary first invention of the present application is a motor drive device for driving a motor, including an electric circuit that includes first to N-th control systems that individually supply drive currents to respective first to N-th coil groups included in the motor, wherein an n-th control system includes: an n-th inverter that supplies the n-th coil group with the drive current; an n-th current command value setting unit that sets an n-th current command value according to an input signal from an outside; an n-th controller that supplies a drive instruction to a drive circuit of the n-th inverter, based on the n-th current command value; and an n-th failure detector that detects a failure in the n-th inverter or the n-th coil group, where N is an integer of two or more, and n is any integer from 1 to N, when the n-th failure detector detects the failure, an operation of the n-th control system is stopped or is caused to fall back, the electric circuit includes a main computing device and an auxiliary computing device that perform a computational process, based on a preset program, the main computing device executes a function of N-th current command value setting unit from the first current command value setting unit, a function of the N-th controller from the first controller, and a function of the N-th failure detector from the first failure detector, and in case the main computing device fails, the auxiliary computing device executes the functions of the n-th current command value setting unit, the n-th controller, and the n-th failure detector in at least one emergency control system among the first to N-th control systems.

Advantageous Effects of Invention

The exemplary first invention of the present application individually sets the current command values for the respective control systems. Furthermore, the present invention detects a failure in any of the inverters and the coil groups with respect to each control system, and stops only the failed control system or causes only the failed control system to fall back. Thus, the flow of excessive current through an inverter or a coil group in the normal control system due to the adverse effect of the failed control system can be prevented. Consequently, high rating components are not required to be adopted, and the motor drive device can be reduced in size and cost.

Furthermore, according to the exemplary first invention of the present application, if the auxiliary computing device is normal even in case the main computing device fails, driving of the motor can be continued using one or some of the control systems.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, examples of a motor drive device and an electric power steering device are described with reference to the drawings.

1. First Preferred Embodiment

1-1. Configuration of Electric Power Steering Device

Figure 1:
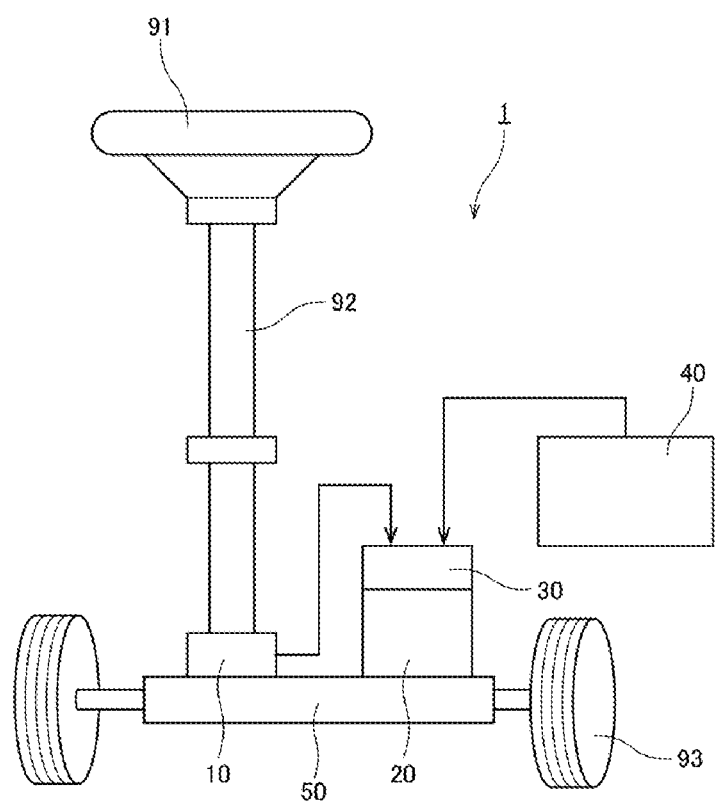
FIG. 1 is a schematic diagram of an electric power steering device.

FIG. 1 is a schematic diagram of an electric power steering device 1 that includes a motor drive device 30 according to a first preferred embodiment. The electric power steering device 1 is a device that assists a driver in steering in a transportation apparatus, such as an automobile. As shown in FIG. 1, the electric power steering device 1 of this preferred embodiment includes a torque sensor 10, a motor 20, and the motor drive device 30.

The torque sensor 10 is attached to a steering shaft 92. When the driver rotates the steering shaft 92 by operating a steering wheel 91, the torque sensor 10 detects the torque applied to the steering shaft 92. A torque signal that is a detected signal of the torque sensor 10 is output from the torque sensor 10 to the motor drive device 30. The motor drive device 30 drives the motor 20 on the basis of the torque signal input from the torque sensor 10. Note that the motor drive device 30 may refer not only to the torque signal but also to other information (e.g., the vehicle speed etc.) in a combined manner.

The motor drive device 30 uses power obtained from a power supply source 40 to supply drive current to the motor 20. The drive force caused by the motor 20 is transmitted through a gearbox 50 to wheels 93. Accordingly, the steering angles of the wheels 93 are changed. Thus, the electric power steering device 1 amplifies the torque of the steering shaft 92 through the motor 20 to change the steering angles of the wheels 93. Consequently, the driver can operate the steering wheel 91 with a low force.

1-2. Configuration of Motor Drive Device

Figure 2:
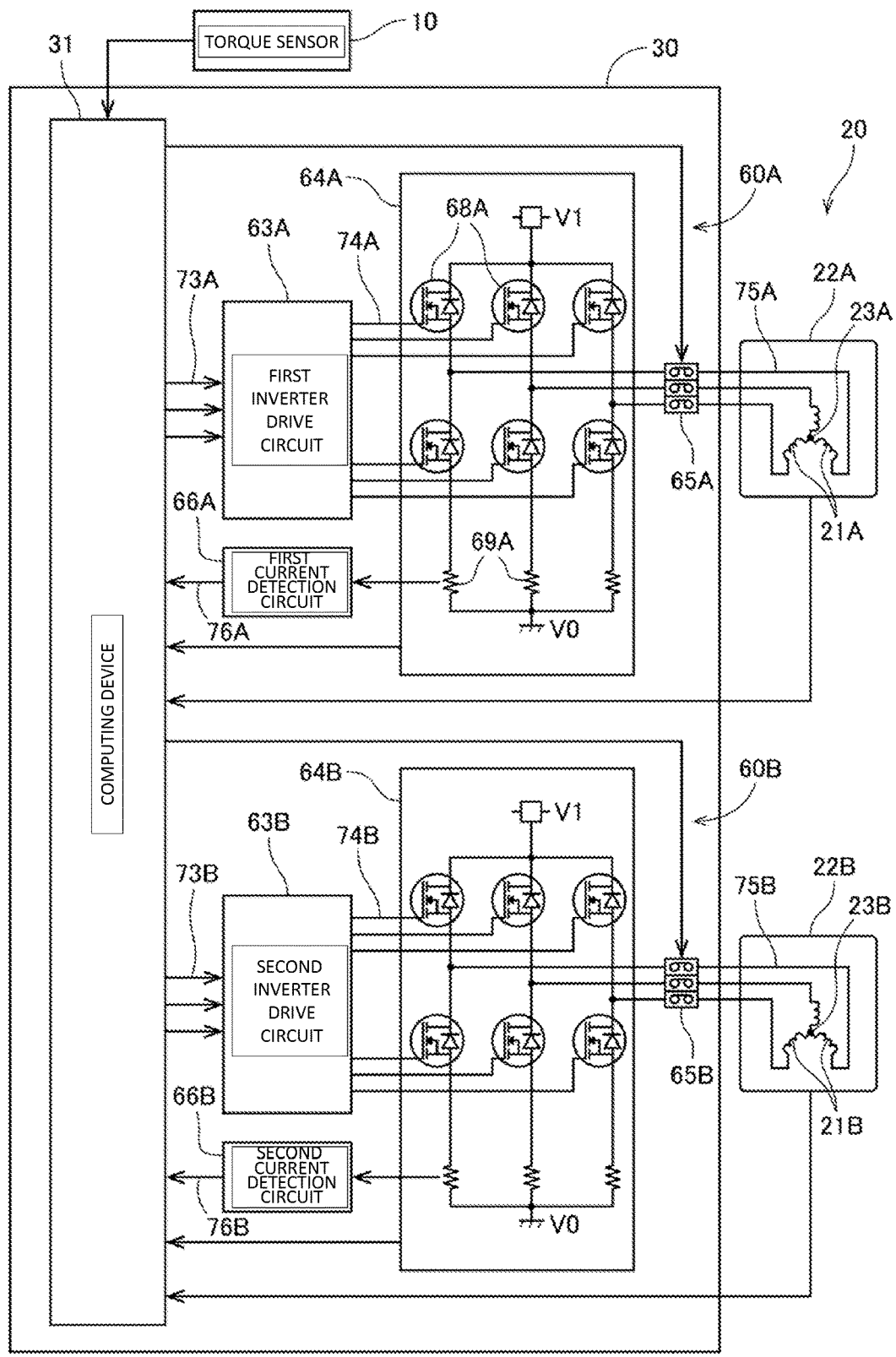
FIG. 2 is a block diagram showing a configuration of a motor drive device.

Subsequently, the configuration of the motor drive device 30 used for the electric power steering device 1 is described. FIG. 2 is a block diagram showing the configuration of the motor drive device 30. As shown in FIG. 2, the motor drive device 30 includes an electric circuit that includes a computing device 31, such as a microcontroller. The motor drive device 30 is electrically connected to the torque sensor 10, the motor 20, and the power supply source 40 (see FIG. 1).

In this preferred embodiment, a three-phase synchronous brushless motor is adopted as the motor 20 of the electric power steering device 1. When the motor 20 is driven, each of U-phase, V-phase and W-phase currents is supplied from the motor drive device 30 to a plurality of coils 21A and 21B in the motor 20. Accordingly, rotating magnetic fields occur between stators including the coils 21A and 21B and rotors including magnets. As a result, the rotors rotate with respect to the stators of the motor 20.

As shown in FIG. 2, the motor 20 of this preferred embodiment includes two coil groups that each include U-phase, V-phase and W-phase coils. Hereinafter, the two coil groups are called a first coil group 22A and a second coil group 22B. The three coils 21A of the first coil group 22A are connected in a star connection, and the three coils 21B of the second coil group 22B are also connected in a star connection. Alternatively, each of the first coil group 22A and the second coil group 22B may be connected in a delta connection.

The motor drive device 30 supplies the drive currents individually to the first coil group 22A and the second coil group 22B. That is, the motor drive device 30 includes a first control system 60A that supplies the drive current to the first coil group 22A, and a second control system 60B that supplies the drive current to the second coil group 22B.

Figure 3:
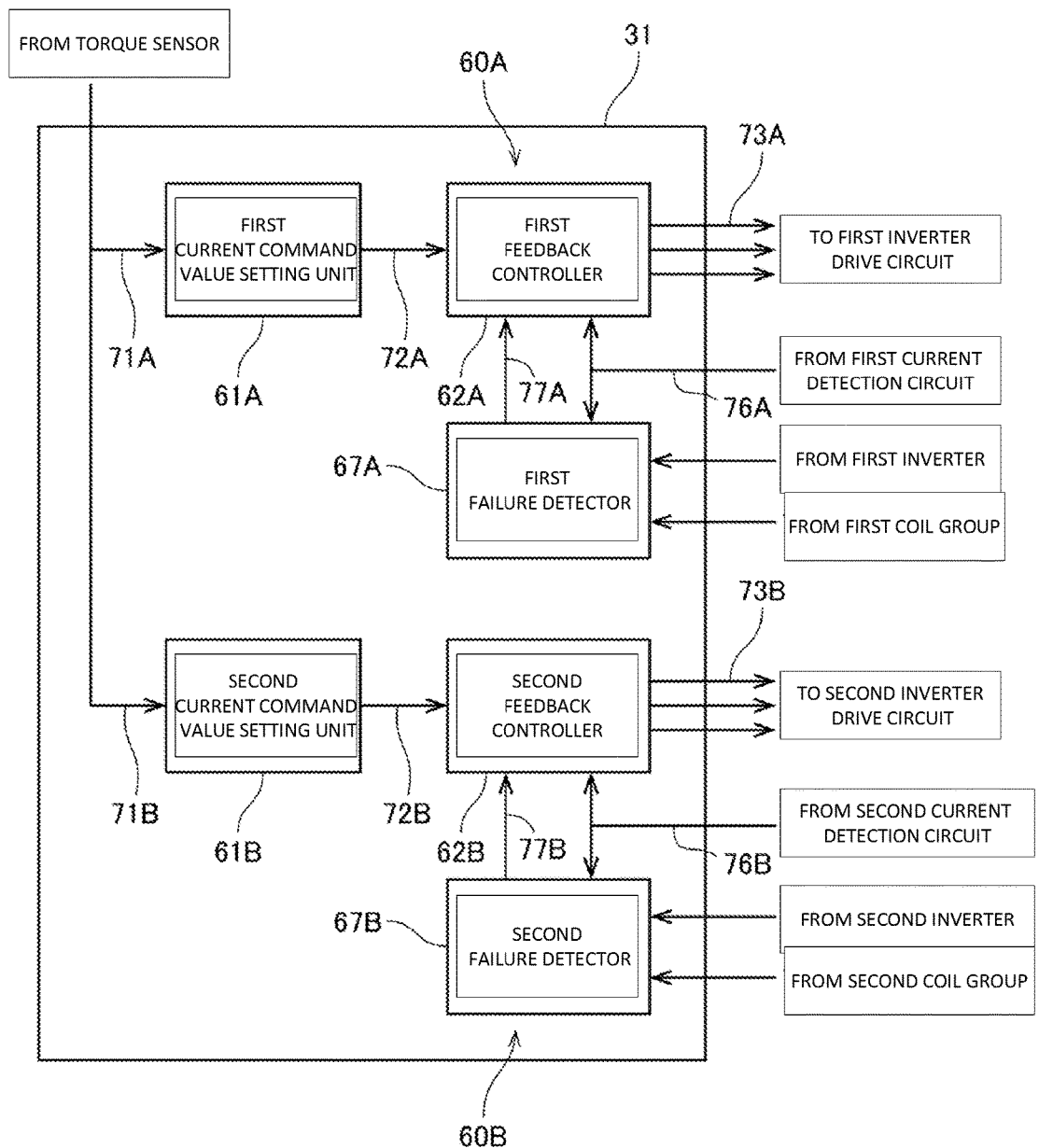
FIG. 3 is a functional block diagram of a computing device.

FIG. 3 is a functional block diagram of the computing device 31. As shown in FIGS. 2 and 3, the first control system 60A includes a first current command value setting unit 61A, a first feedback controller 62A, a first inverter drive circuit 63A, a first inverter 64A, a first current breaker 65A, a first current detection circuit 66A, and a first failure detector 67A. Each of the functions of the first current command value setting unit 61A, the first feedback controller 62A, and the first failure detector 67A is realized by a CPU in the computing device 31 executing a computational process on the basis of a preset program.

The torque signal output from the torque sensor 10, and other various signals are input as an input signal 71A into the first current command value setting unit 61A. The first current command value setting unit 61A then sets a first current command value 72A according to the input signal 71A. The computing device 31 preliminarily stores reference data that is called an assist map and defines the correspondence relationship between the input signal 71A and the first current command value 72A. The first current command value setting unit 61A determines the first current command value 72A corresponding to the input signal 71A on the basis of the assist map.

The first feedback controller 62A provides the first inverter drive circuit 63A with a drive instruction 73A on the basis of the first current command value 72A obtained from the first current command value setting unit 61A and of a detected signal 76A of the first current detection circuit 66A, described later. More specifically, the drive instruction 73A is generated so that the current value detected by the first current detection circuit 66A can approach a current value corresponding to the first current command value 72A. The drive instruction 73A contains information on the duty ratio of a PWM signal 74A supplied to the first inverter 64A. The generated drive instruction 73A is output as an electric signal from the computing device 31, and is supplied to the first inverter drive circuit 63A.

The first inverter drive circuit 63A is an electric circuit for operating the first inverter 64A. The first inverter drive circuit 63A supplies the six switching elements 68A of the first inverter 64A with the PWM signal 74A, which is a pulse wave, according to the drive instruction 73A output from the computing device 31. The PWM signal 74A supplied to each switching element 68A has a duty ratio designated by the drive instruction 73A.

The first inverter 64A is a power converter that generates a drive current 75A on the basis of the PWM signal 74A. As shown in FIG. 2, the first inverter 64A includes the six switching elements 68A. For example, a transistor, such as a FET, is adopted as the switching element 68A. In the example in FIG. 2, between a power source voltage V1 and a ground voltage V0, three sets of two switching elements 68A connected in series are provided in parallel.

One ends of the three coils 21A of the first coil group 22A are connected to each other at a neutral point 23A. The other ends of the three coils 21A are connected between the switching elements 68A on the positive side and the switching elements 68A on the negative side in the three sets of switching elements 68A of the first inverter 64A. When the six switching elements 68A are turned on and off according to the PWM signal 74A, the drive current 75A is supplied from the first inverter 64A to the coils 21A in respective phases of the first coil group 22A according to the on and off state.

As shown in FIG. 2, the first inverter 64A includes three first shunt resistors 69A. The three first shunt resistors 69A are inserted between the switching elements 68A on the negative side in the three sets of switching elements 68A and the ground voltage V0. When the drive current 75A is supplied to the first coil group 22A, the current in each phase flowing back from the first coil group 22A to the first inverter 64A flows through the three first shunt resistors 69A.

The first current breaker 65A is provided on the path of each of three-phase currents between the first inverter 64A and the first coil group 22A. For example, mechanical relays or FETs are adopted for the first current breaker 65A. The first current breaker 65A can switch the paths of currents between an energized state and a broken state, on a phase-by-phase basis, based on the signal from the computing device 31.

The first current detection circuit 66A is an electric circuit that detects the currents flowing through the first shunt resistors 69A. The first current detection circuit 66A measures the potential difference between the opposite ends of the three first shunt resistors 69A, thereby generating the detected signal 76A that indicates the current (shunt current) flowing through each first shunt resistor 69A. The generated detected signal 76A is transmitted from the first current detection circuit 66A to the computing device 31.

The first failure detector 67A detects presence or absence of a failure in the first inverter 64A or the first coil group 22A on the basis of the detected signal 76A obtained from the first current detection circuit 66A. Here, it is determined whether or not the values of three shunt currents indicated by the detected signal 76A are values within an acceptable range on a phase-by-phase basis. If any shunt current is out of the acceptable range, it is determined that a failure occurs in the phase of the first inverter 64A or the first coil group 22A corresponding to the shunt current. A detected result 77A of the first failure detector 67A is input into the first feedback controller 62A.

Note that in the first inverter 64A, a sensor (not shown) that monitors the operation states of the switching elements 68A are provided. The first failure detector 67A may detect not only the shunt currents but also presence or absence of a failure in the first inverter 64A on the basis of a detected signal of the sensor in the first inverter 64A. The first failure detector 67A may detect presence or absence of a failure in the first coil group 22A on the basis of the voltage value of each element of the first coil group 22A.

The second control system 60B has a configuration equivalent to that of the first control system 60A. That is, as shown in FIGS. 2 and 3, the second control system 60B includes a second current command value setting unit 61B, a second feedback controller 62B, a second inverter drive circuit 63B, a second inverter 64B, a second current breaker 65B, a second current detection circuit 66B, and a second failure detector 67B. The second control system 60B operates each of these elements, thereby supplying a drive current 75B to the second coil group 22B. The detailed operation of each element in the second control system 60B is analogous to that of the first control system 60A described above. Consequently, redundant description is omitted. In FIGS. 2 and 3, signals sent and received between the elements in the second control system 60B are assigned symbols 71B to 77B corresponding to the signals 71A to 77A between the elements of the first control system 60A.

1-3. About Fail-Safe Function of Motor Drive Device

The motor drive device 30 has a fail-safe function that continues the operation of the electric power steering device 1 while preventing the device from causing a misoperation due to a failure, in case any of the first inverter 64A, the first coil group 22A, the second inverter 64B, and the second coil group 22B fails. Hereinafter, the fail-safe function is described with reference to a flowchart of FIG. 4.

Figure 4:
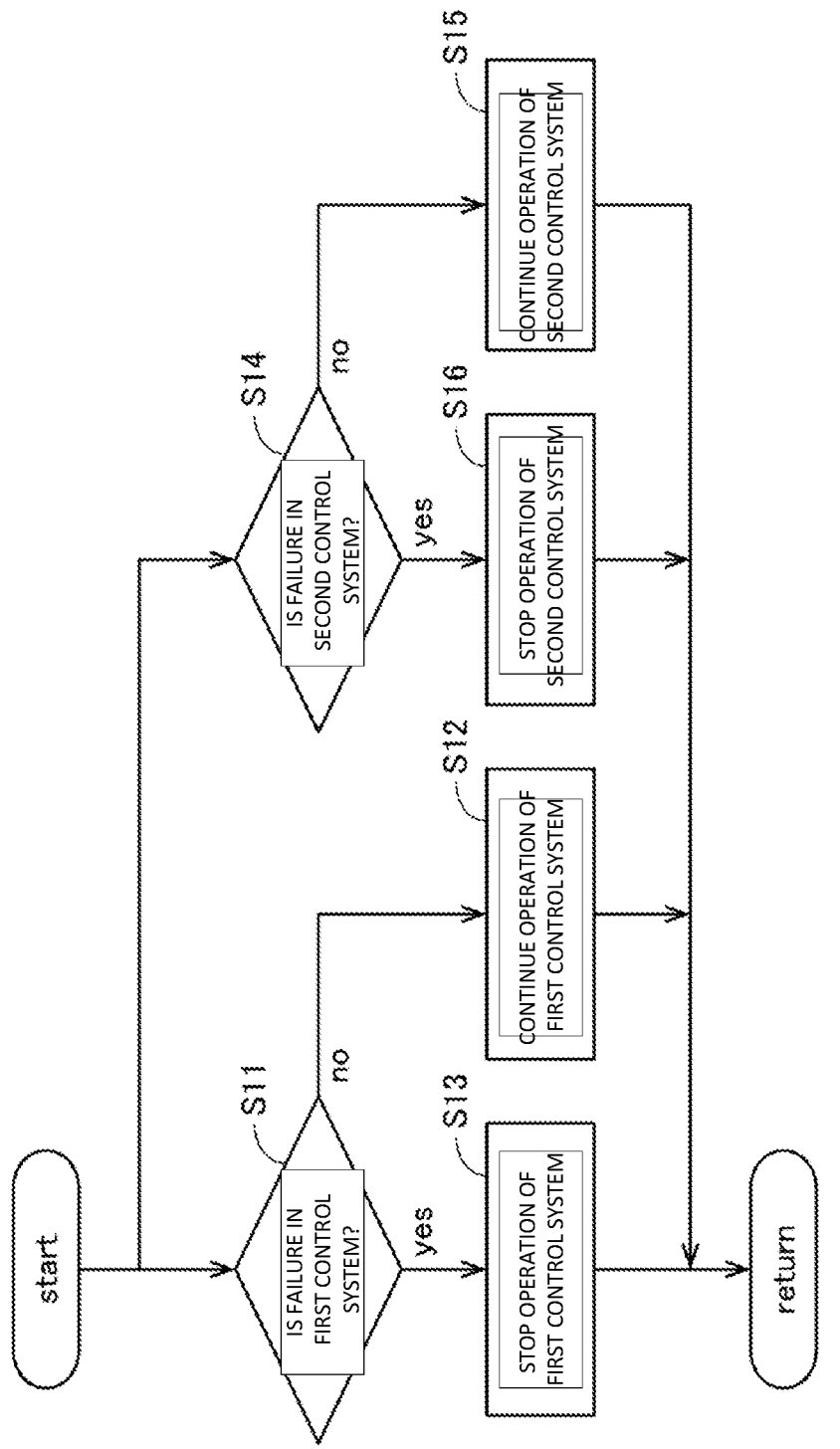
FIG. 4 is a flowchart showing a flow of a fail-safe process.

As shown in FIG. 4, during the operation of the motor drive device 30, the computing device 31 repetitively monitors presence or absence of a failure in the first control system 60A and presence or absence of a failure in the second control system 60B (steps S11 and S14). More specifically, the first failure detector 67A in the computing device 31 monitors whether or not a failure is in the first inverter 64A or the first coil group 22A in the first control system 60A (step S11). The first failure detector 67A then notifies the first feedback controller 62A of the detected result. The second failure detector 67B in the computing device 31 monitors whether or not a failure is in the second inverter 64B or the second coil group 22B in the second control system 60B (step S14). The second failure detector 67B then notifies the second feedback controller 62B of the detected result.

Note that the computing device 31 may execute the detection process in the first failure detector 67A and the detection process in the second failure detector 67B, in parallel to each other, or sequentially and alternately. Execution of the detection process in the first failure detector 67A and the detection process in the second failure detector 67B in parallel to each other can reduce the process time required to detect a failure. On the contrary, sequential and alternate execution of the detection process in the first failure detector 67A and the detection process in the second failure detector 67B can detect a failure using a simple logic.

When the first failure detector 67A detects no failure (no in step S11), the first feedback controller 62A continues a normal operation (step S12). That is, the first feedback controller 62A provides the first inverter drive circuit 63A with the drive instruction 73A on the basis of the first current command value 72A and the detected signal 76A of the first current detection circuit 66A.

In case a failure occurs in the first inverter 64A or the first coil group 22A, the first failure detector 67A detects the failure (yes in step S11). The first failure detector 67A then notifies the first feedback controller 62A of the detected result that indicates the failure. Accordingly, the first feedback controller 62A stops the operation of the first control system 60A (step S13).

In step S13, the first feedback controller 62A stops the drive instruction 73A to the first inverter drive circuit 63A, for example. Thus, the operation of the first inverter 64A is stopped, which prevents the drive current 75A from being supplied to the first coil group 22A. The first feedback controller 62A may break the path of the drive current 75A at the first current breaker 65A. When the path of the drive current 75A is broken, electromagnetic braking due to the first coil group 22A can be prevented from occurring. Consequently, a load on the rotation of the motor 20 affected by the stopped first coil group 22A can be prevented from being applied.

On the other hand, the second control system 60B detects a failure and determines to stop operation, independently from the first control system 60A. When the second failure detector 67B detects no failure (no in step S14), the second feedback controller 62B continues a normal operation (step S15). That is, the second feedback controller 62B provides the second inverter drive circuit 63B with the drive instruction 73B on the basis of the second current command value 72B and the detected signal 76B of the second current detection circuit 66B.

In case a failure occurs in the second inverter 64B or the second coil group 22B, the second failure detector 67B detects the failure (yes in step S14). The second failure detector 67B then notifies the second feedback controller 62B of the detected result that indicates the failure. Accordingly, the second feedback controller 62B stops the operation of the second control system 60B (step S16).

In step S16, the second feedback controller 62B stops the drive instruction 73B to the second inverter drive circuit 63B, for example. Thus, the operation of the second inverter 64B is stopped, which prevents the drive current 75B from being supplied to the second coil group 22B. The second feedback controller 62B may break the path of the drive current 75B at the second current breaker 65B. When the path of the drive current 75B is broken, electromagnetic braking due to the second coil group 22B can be prevented from occurring. Consequently, a load on the rotation of the motor 20 affected by the stopped second coil group 22B can be prevented from being applied.

As described above, in the motor drive device 30 of this preferred embodiment, the first control system 60A and the second control system 60B individually set the respective current command values 72A and 72B. Furthermore, the first control system 60A and the second control system 60B individually detect a failure in the inverters or the coil groups, and stops only the failed control system. Consequently, in case a failure occurs in any one of the first control system 60A and the second control system 60B, the operation of the electric power steering device 1 can be continued by the other control system. The feedback paths are independent of each other with respect to each control system. Accordingly, excessive current affected by the failed control system is prevented from flowing through the inverter or coil group in the normal control system. Consequently, high rating components are not required to be used, and the motor drive device 30 can be reduced in size and cost.

In particular, according to this preferred embodiment, in the single computing device 31, each of the functions of the first current command value setting unit 61A, the first feedback controller 62A, the first failure detector 67A, the second current command value setting unit 61B, the second feedback controller 62B, and the second failure detector 67B is executed. Consequently, the operations of the two control systems 60A and 60B can be realized without arranging a plurality of computing devices 31 in the motor drive device 30. Thus, the motor drive device 30 can be further reduced in size and cost.

1-4. Modified Example

Subsequently, a modified example of the first preferred embodiment is described.

Figure 5:
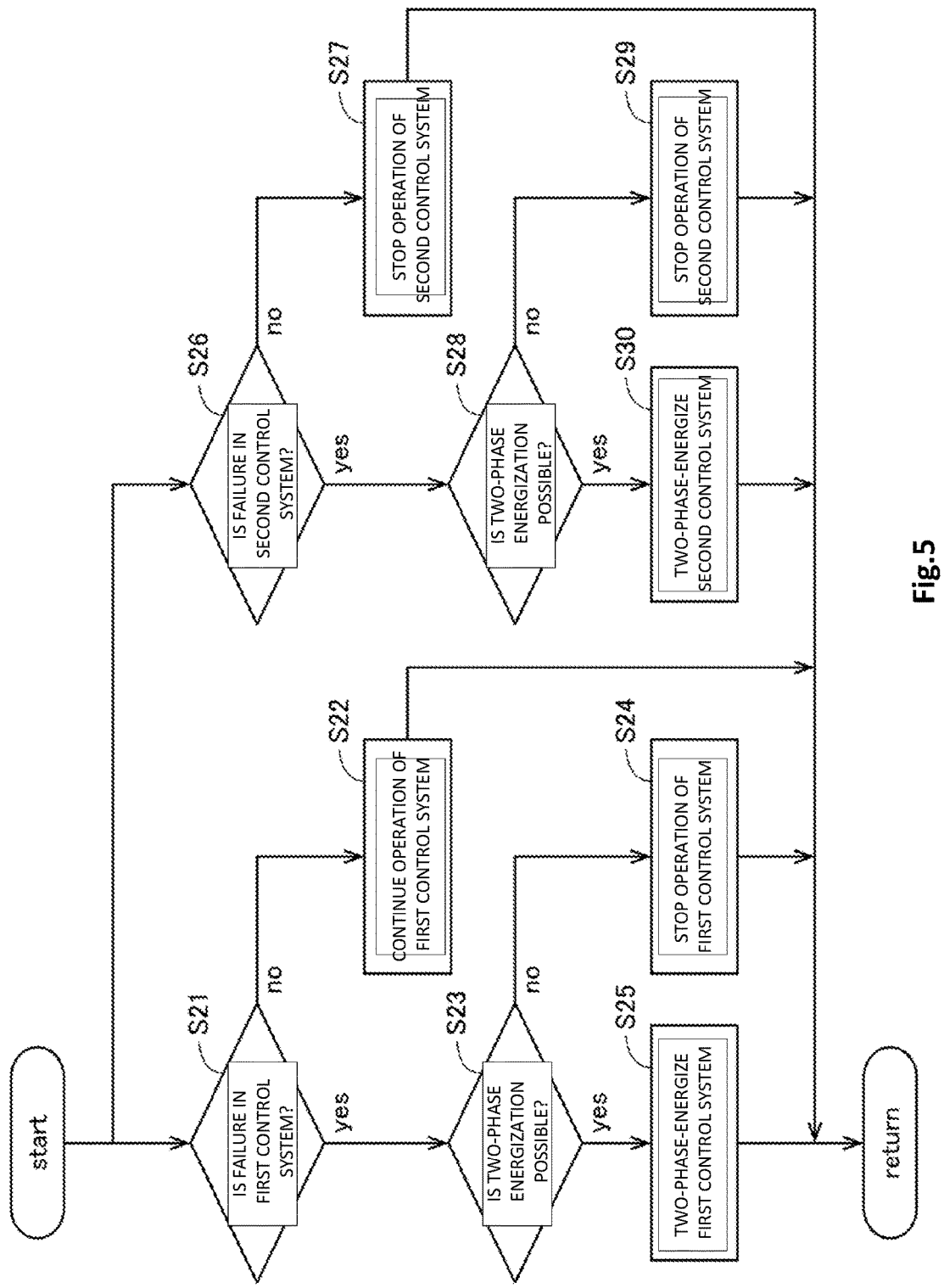
FIG. 5 is a flowchart showing a flow of a fail-safe process according to a modified example.

FIG. 5 is a flowchart showing a flow of a fail-safe process according to one modified example. Also in an example in FIG. 5, as with the preferred embodiment described above, the computing device 31 repetitively monitors presence or absence of a failure in the first control system 60A and presence or absence of a failure in the second control system 60B (steps S21 and S26).

When the first failure detector 67A detects no failure (no in step S21), the first feedback controller 62A continues the normal operation (step S22). When the second failure detector 67B detects no failure (no in step S26), the second feedback controller 62B continues the normal operation (step S27).

In case a failure occurs in the first inverter 64A or the first coil group 22A, the first failure detector 67A detects the failure (yes in step S21). Here, in the example in FIG. 5, the first failure detector 67A analyzes the state of the detected failure. More specifically, it is determined whether what is called two-phase energization, or generation of a rotating magnetic field only by two-phase drive current 75A in the three-phase drive current 75A in the first control system 60A, is possible or not (step S23).

When it is determined that two or more phases among the three phases fail and two-phase energization is impossible (no in step S23), the first feedback controller 62A stops the operation of the first control system 60A (step S24). When it is determined that two phases among the three phases are normal and two-phase energization is possible (yes in step S23), the first feedback controller 62A provides the first inverter drive circuit 63A with a drive instruction for two-phase energization. Consequently, only two-phase drive current is supplied from the first inverter 64A to the first coil group 22A.

As shown in FIG. 5, also in the second control system 60B, the processes in steps S26 to S30 equivalent to steps S21 to S25 in the first control system 60A are executed. According to such a configuration, in case the first control system 60A or the second control system 60B fails, a fallback operation through two-phase energization can be performed without completely stopping the function of the coil group even in the failed control system. That is, even in the failed control system, the operation can be continued with the function falling back.

That is, in the example in FIG. 5, in case only one phase in one control system between the first control system 60A and the second control system 60B fails, the motor 20 is allowed to generate a torque using not only three phases in the normal control system but also the normal two phases in the failed control system, or total five phases. Consequently, a higher torque can be obtained than that in the case of only using the three phases in the normal control system. At this time, the three phases in the normal control system and the normal two phases in the failed control system may be independently controlled. Alternatively, the total five phases may be integrally controlled.

Figure 6:
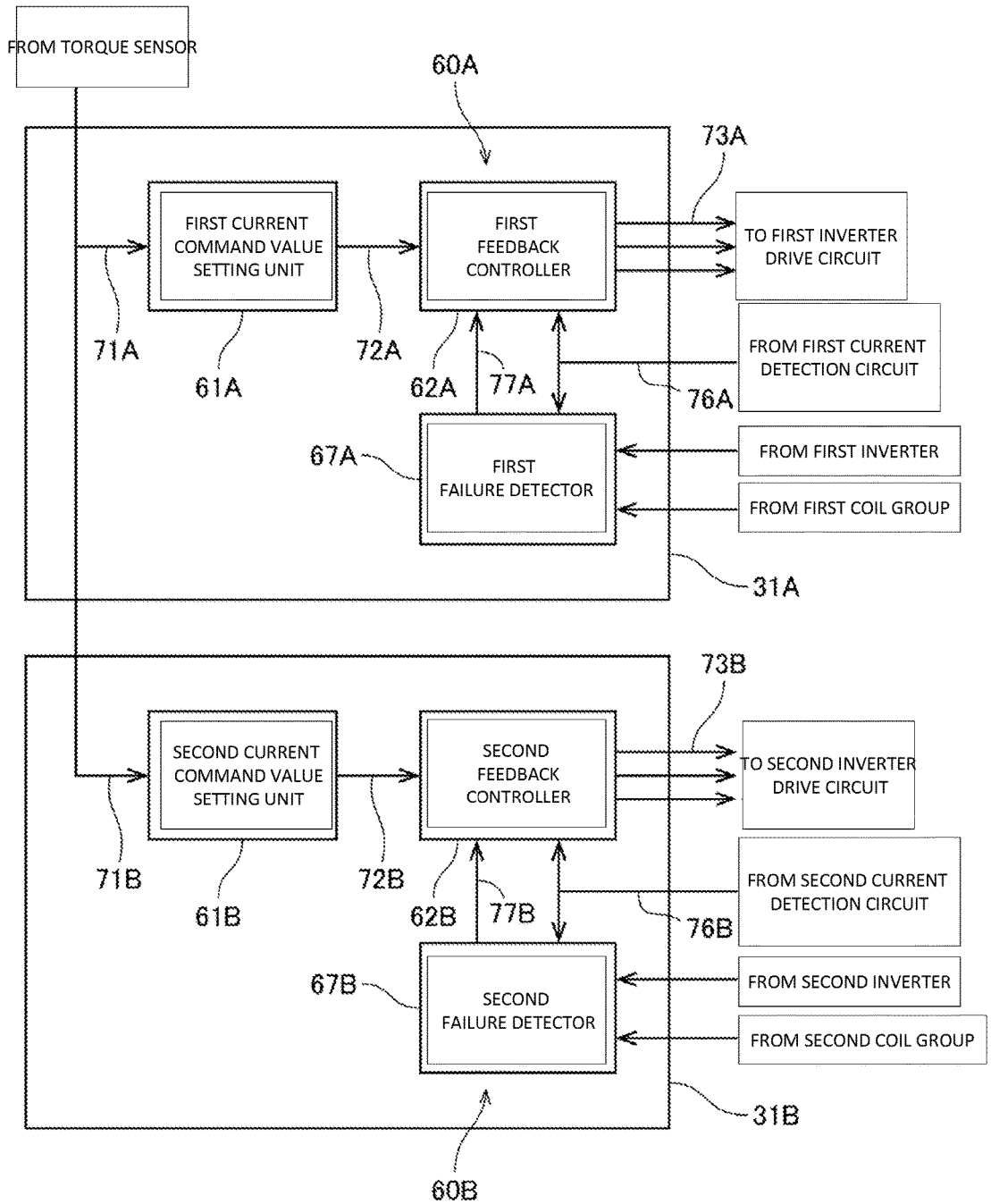
FIG. 6 is a functional block diagram of a computing device according to a modified example.

FIG. 6 is a functional block diagram of a computing device 31 according to another modified example. In the example in FIG. 6, in the motor drive device 30, a first computing device 31A that takes charge of a first control system 60A, and a second computing device 31B that takes charge of a second control system 60B are separately provided. The first computing device 31A executes the functions of a first current command value setting unit 61A, a first feedback controller 62A, and a first failure detector 67A in the first control system 60A. The second computing device 31B executes the functions of a second current command value setting unit 61B, a second feedback controller 62B, and a second failure detector 67B in the second control system 60B.

Thus, in the example in FIG. 6, one computing device is used for each control system. Accordingly, in case one of the first computing device 31A and the second computing device 31B fails, if the other computing device is normal, the control system of which the other computing device takes charge can be normally operated. Consequently, the operation can be continued without completely stopping the electric power steering device 1.

Figure 7:
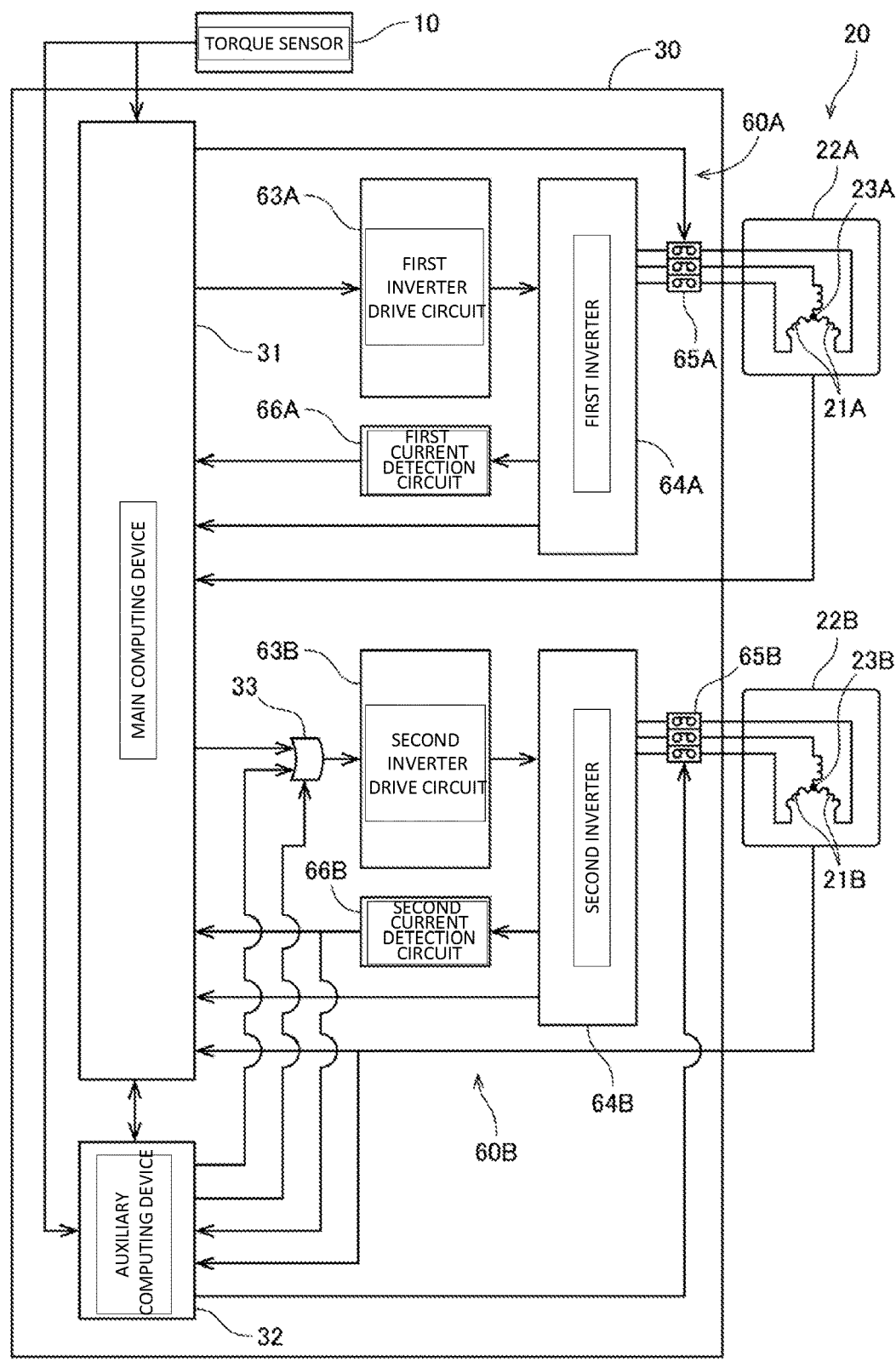
FIG. 7 is a block diagram of a motor drive device according to a modified example.

FIG. 7 is a block diagram of a motor drive device 30 according to another modified example. According to an example in FIG. 7, in the motor drive device 30, a main computing device 31 and an auxiliary computing device 32 are provided. For example, microcontrollers including CPUs are adopted as the main computing device 31 and the auxiliary computing device 32. The main computing device 31 performs an operation equivalent to that of the computing device 31 in the preferred embodiment described above. That is, the main computing device 31 controls both the first control system 60A and the second control system 60B in normal times. In case the main computing device 31 fails, the auxiliary computing device 32 controls only the second control system 60B on behalf of the device 31 in order to take emergency measures.

The auxiliary computing device 32 can execute functions equivalent to those of the second current command value setting unit 61B, the second feedback controller 62B, and the second failure detector 67B described above, according to a preset program. The auxiliary computing device 32 always communicates with the main computing device 31 in normal times, and monitors whether the main computing device 31 normally operates or not. When the auxiliary computing device 32 determines that the main computing device 31 fails, a switching signal is supplied to the switching circuit 33. Accordingly, the connection between the main computing device 31 and the second inverter drive circuit 63B is broken at the switching circuit 33, and the auxiliary computing device 32 and the second inverter drive circuit 63B are connected to each other. Consequently, the drive instruction can be supplied from the auxiliary computing device 32 to the second inverter drive circuit 63B.

According to such a configuration, if the auxiliary computing device 32 is normal even in case the main computing device 31 between the main computing device 31 and the auxiliary computing device 32 fails, the operation of the electric power steering device 1 can be continued only by the second control system 60B.

In the example in FIG. 7, the second current breaker 65B makes the path of current flowable or unflowable on the basis of the signal from the auxiliary computing device 32 instead of the main computing device 31. According to such a configuration, there is no possibility that the second current breaker 65B is subjected to abnormal on and off operations from the main computing device 31 in case the main computing device 31 fails. Consequently, in case the main computing device 31 fails, the path of current in the second control system 60B controlled by the auxiliary computing device 32 can be securely made flowable.

In the example in FIG. 7, in case both the main computing device 31 and the auxiliary computing device 32 fail, the driver is forced to operate the steering wheel 91 without assistance by the electric power steering device 1. At this time, when the first current breaker 65A or the second current breaker 65B is made flowable, a possibility arises that the steering wheel becomes heavier owing to the electromagnetic braking. Consequently, in case both the main computing device 31 and the auxiliary computing device 32 fail, both the first current breaker 65A and the second current breaker 65B may be switched to the broken state.

In the preferred embodiment described above, the motor 20 includes the two coil groups 22A and 22B, and the motor drive device 30 includes the two control systems 60A and 60B corresponding thereto. Alternatively, the motor 20 may include three or more coil groups, and the motor drive device 30 may include three or more control systems corresponding thereto.

That is, in a generalized manner assuming that N is an integer of two or more, the motor 20 may include the first to n-th coil groups. In this case, it is only required that the motor drive device 30 includes the first to N-th control systems that individually supply the drive currents to the respective coil groups. Any integer from 1 to N is assumed as n. It is only required that as with each control system in the preferred embodiment described above, the n-th control system from the first to N-th control systems includes the n-th current command value setting unit, the n-th feedback controller, the n-th inverter drive circuit, the n-th inverter, the n-th current breaker, the n-th current detection circuit, and the n-th failure detector.

The n-th current command value setting unit sets the current command value in the n-th control system. The n-th failure detector detects a failure in the n-th inverter or the n-th coil group. Only the operation in the control system where a failure has been detected is caused to fall back. Such a configuration can prevent the flow of excessive current through the inverter or the coil group in the normal control system due to the adverse effect of the failed control system can be prevented. Consequently, high rating components are not required to be used, and the motor drive device can be reduced in size and cost.

The motor drive device 30 may be applied to a device other than the power steering device. For example, a motor used for another site in the transportation apparatus may be driven by the motor drive device 30. A motor mounted in an apparatus other than an automobile, such as an industrial robot, may be driven by the motor drive device 30 described above.

The detailed configuration of the motor drive device may be different from the configuration described in each diagram shown in the present application. For example, a part of the function of the computing device may be realized by an electric circuit. The elements recited in the preferred embodiment or modified example described above may be appropriately combined in a range without causing contradiction.

Figure 8:
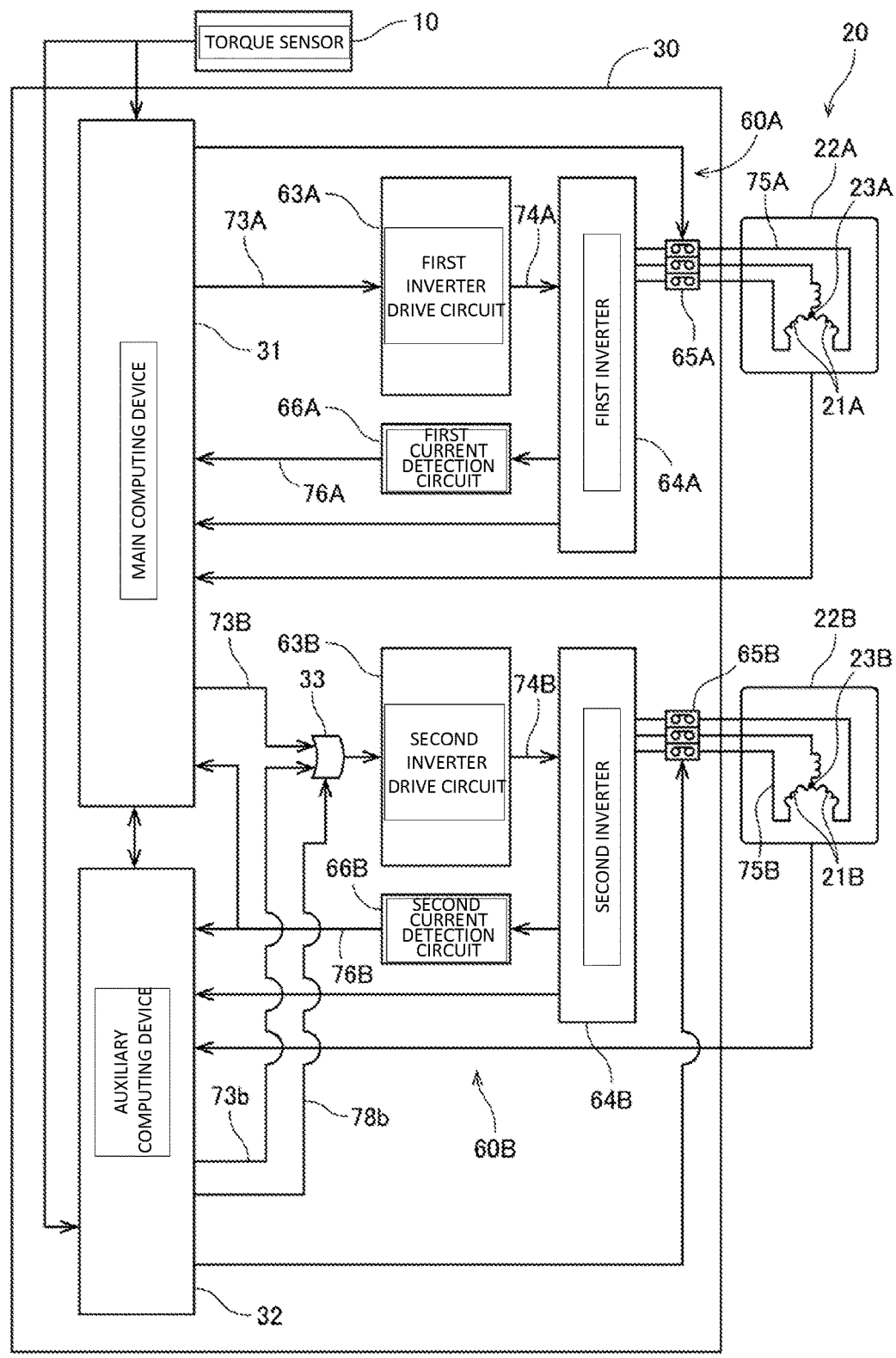
FIG. 8 is a block diagram showing a configuration of a motor drive device according to a second preferred embodiment of the present invention.

2. Second Preferred Embodiment 2-1. Configuration and Operation of Motor Drive Device Subsequently, a motor drive device 30 according to a second preferred embodiment is described. FIG. 8 is a block diagram showing the configuration of the motor drive device 30. The motor drive device 30 in FIG. 8 is used for the electric power steering device 1 as with the first preferred embodiment. Hereinafter, the difference from the first preferred embodiment is mainly described. Redundant description on the portions common to the first preferred embodiment are omitted.

Also in this preferred embodiment, the motor 20 includes a first coil group 22A and a second coil group 22B. The motor drive device 30 includes a first control system 60A that supplies the drive current to the first coil group 22A, and a second control system 60B that supplies the drive current to the second coil group 22B. The motor drive device 30 individually supplies the two coil groups 22A and 22B with the drive currents using the first control system 60A and the second control system 60B, thereby driving the motor 20.

According to this preferred embodiment, among the electric circuits constituting the motor drive device 30, a main computing device 31 and an auxiliary computing device 32 are provided. For example, microcontrollers including CPUs are adopted as the main computing device 31 and the auxiliary computing device 32. The main computing device 31 performs an operation equivalent to that of the computing device 31 in the preferred embodiment described above. That is, the main computing device 31 controls both the first control system 60A and the second control system 60B in normal times. In case the main computing device 31 fails, the auxiliary computing device 32 controls only the second control system 60B on behalf of the device 31 in order to take emergency measures.

Figure 9:
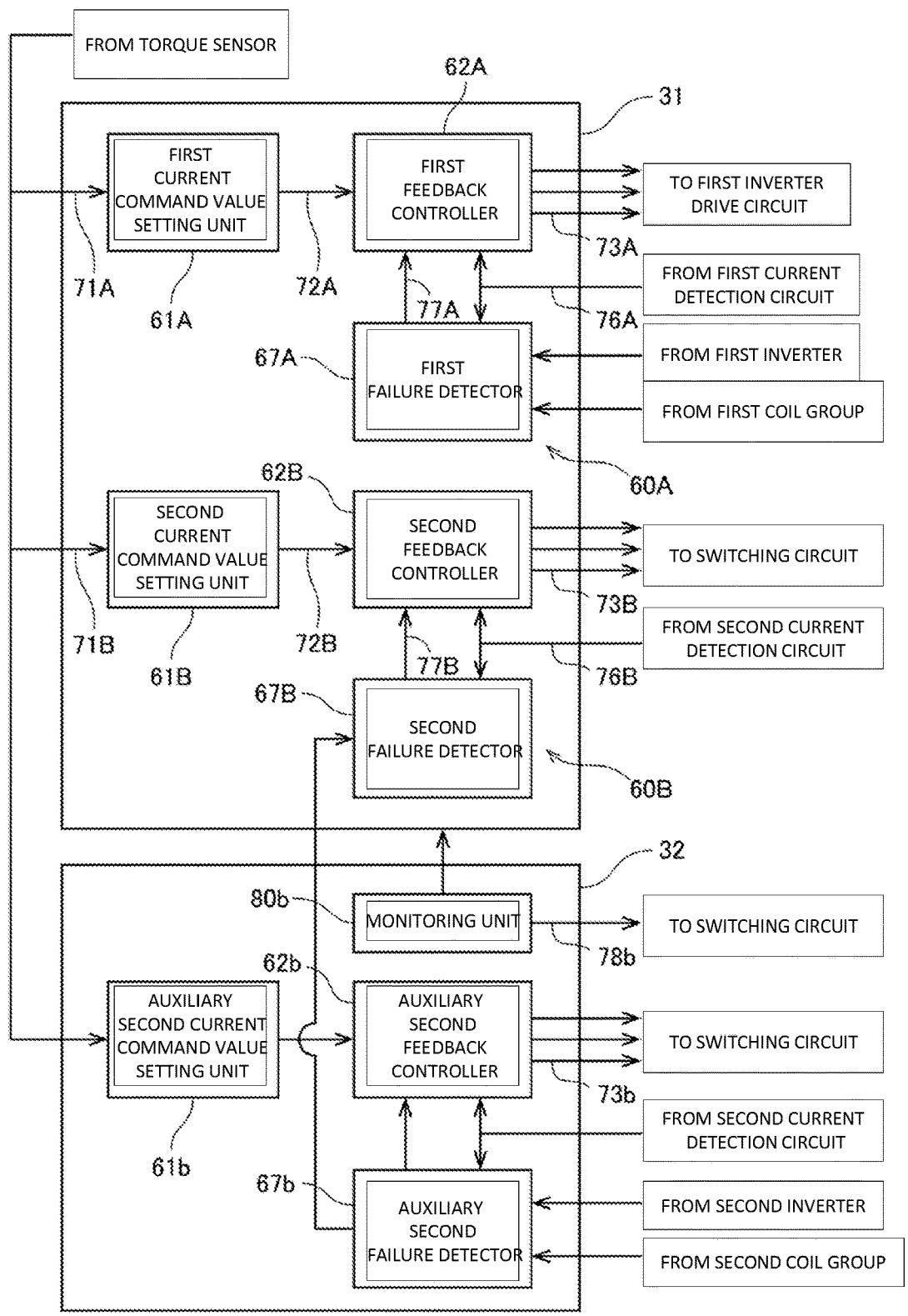
FIG. 9 is a functional block diagram of a main computing device and an auxiliary computing device according to the second preferred embodiment of the present invention.

FIG. 9 is a functional block diagram of the main computing device 31 and the auxiliary computing device 32 according to the second preferred embodiment. As shown in FIGS. 8 and 9, the first control system 60A includes a first current command value setting unit 61A, a first feedback controller 62A, a first inverter drive circuit 63A, a first inverter 64A, a first current breaker 65A, a first current detection circuit 66A, and a first failure detector 67A. Each of the functions of the first current command value setting unit 61A, the first feedback controller 62A, and the first failure detector 67A is realized by a CPU in the main computing device 31 executing a computational process on the basis of a preset program. The first control system 60A operates each of these elements 61A to 67A, thereby supplying drive current to the first coil group 22A.

The second control system 60B includes a second current command value setting unit 61B, a second feedback controller 62B, a second inverter drive circuit 63B, a second inverter 64B, a second current breaker 65B, a second current detection circuit 66B, and a second failure detector 67B. Each of the functions of the second current command value setting unit 61B, the second feedback controller 62B, and the second failure detector 67B is realized by the CPU in the main computing device 31 executing a computational process on the basis of a preset program. The second control system 60B operates each of these elements 61B to 67B, thereby supplying drive current to the second coil group 22B.

The detailed operation of each of the elements 61A to 67A and 61B to 67B in the first control system 60A and the second control system 60B is analogous to that of the first preferred embodiment. Consequently, redundant description is omitted. In FIGS. 8 and 9, signals sent and received between the elements in the first control system 60A and the second control system 60B are assigned the same symbols 71A to 77A and 71B to 77B as those in the first preferred embodiment.

The motor drive device 30 uses the main computing device 31 to execute the operations of the first control system 60A and the second control system 60B when the main computing device 31 does not fail. That is, a process equivalent to the process in FIG. 4 described in the first preferred embodiment is executed. The main computing device 31 individually sets the current command values 72A and 72B for the respective control systems. Furthermore, the main computing device 31 detects a failure in any of the inverters 64A and 64B and the coil groups 22A and 22B with respect to each control system, and stops only the failed control system or causes only the failed control system to fall back. Thus, the flow of excessive current through an inverter or a coil group in the normal control system due to the adverse effect of the failed control system can be prevented. Consequently, high rating components are not required to be used, and the motor drive device 30 can be reduced in size and cost, as with the first preferred embodiment.

Note that as shown in FIGS. 8 and 9, according to the motor drive device 30, even when the main computing device 31 normally operates, the detected signal of the sensor in the second inverter 64B and the voltage value in each element of the second coil group 22B are input through the auxiliary computing device 32 into the main computing device 31. A signal for switching the second current breaker 65B is output from the main computing device 31 through the auxiliary computing device 32 to the second current breaker 65B. Thus, according to the motor drive device 30, the main computing device 31 performs a part of input and output of information into and from the second control system through the auxiliary computing device 32. Such a configuration can reduce the number of terminals of the main computing device 31. As a result, for example, semiconductor elements having the same number of terminals may be adopted as the main computing device 31 and the auxiliary computing device 32. Consequently, the manufacturing cost of the motor drive device 30 can be further reduced.

Meanwhile, as shown in FIG. 9, the auxiliary computing device 32 includes an auxiliary second current command value setting unit 61b, an auxiliary second feedback controller 62b, and an auxiliary second failure detector 67b. The auxiliary second current command value setting unit 61b, the auxiliary second feedback controller 62b, and the auxiliary second failure detector 67b have the respective functions equivalent to those of the second current command value setting unit 61B, the second feedback controller 62B, and the second failure detector 67B. Each of the functions of the auxiliary second current command value setting unit 61b, the auxiliary second feedback controller 62b, and the auxiliary second failure detector 67b is realized by the CPU in the auxiliary computing device 32 executing a computational process on the basis of a preset program.

The auxiliary computing device 32 further includes a monitoring unit 80b that monitors presence or absence of a failure in the main computing device 31. The function of the monitoring unit 80b is also realized by the CPU in the auxiliary computing device 32 executing a computational process on the basis of a preset program. When the main computing device 31 normally operates, the auxiliary computing device 32 does not control any of the first control system 60A and the second control system 60B. That is, the auxiliary computing device 32 does not output any of the drive instruction 73A to the first inverter drive circuit 63A and the drive instruction 73B to the second inverter drive circuit 63B. However, the monitoring unit 80b of the auxiliary computing device 32 always monitors presence or absence of a failure in the main computing device 31.

As shown in FIG. 8, the motor drive device 30 includes the switching circuit 33. For example, a logic IC is adopted as the switching circuit 33. The switching circuit 33 connects the main computing device 31 and the auxiliary computing device 32 to the second inverter drive circuit 63B in an alternative manner on the basis of a switching signal 78*b* output from the monitoring unit 80*b* of the auxiliary computing device 32. That is, the switching circuit 33 switches the second inverter drive circuit 63B connected to the second inverter 64B between a first state where the drive instruction 73B output from the main computing device 31 is input and a second state where a drive instruction 73*b* output from the auxiliary computing device 32 is input, on the basis of the switching signal 78*b*.

When the monitoring unit 80*b* of the auxiliary computing device 32 detects a failure in the main computing device 31, this unit outputs, to the switching circuit 33, the switching signal 78*b* for instruction in switching from the first state to the second state. Upon receipt of the switching signal 78*b*, the switching circuit 33 breaks the connection between the main computing device and the second inverter drive circuit 63B and connects the auxiliary computing device 32 to the second inverter drive circuit 63B. Consequently, the auxiliary second current command value setting unit 61*b*, the auxiliary second feedback controller 62*b*, and the auxiliary second failure detector 67*b* in the auxiliary computing device 32 can perform each of the functions of the second current command value setting unit 61B, the second feedback controller 62B, and the second failure detector 67B in the main computing device 31 on behalf thereof. The motor drive device 30 uses the auxiliary second current command value setting unit 61*b*, the auxiliary second feedback controller 62*b*, the second inverter drive circuit 63B, the second inverter 64B, the second current breaker 65B, the second current detection circuit 66B, and the auxiliary computing device 32 to operate the second control system 60B emergently.

Thus, according to the motor drive device 30 of this preferred embodiment, the second control system 60B between the first control system 60A and the second control system 60B is set as the emergency control system that emergently performs operation using the auxiliary computing device 32 when the main computing device 31 fails. Consequently, if the auxiliary computing device 32 is normal even in case the main computing device 31 fails, the second control system 60B serving as the emergency control system is used to continue driving the motor 20.

In particular, according to the motor drive device 30, instead of the main computing device 31 itself, the auxiliary computing device 32 monitors the failure in the main computing device 31. Consequently, the failure in the main computing device can be accurately detected. In the motor drive device 30, besides the main computing device 31 and the auxiliary computing device 32, the switching circuit 33 is separately provided. Consequently, switching from the main computing device 31 to the auxiliary computing device 32 can be performed more securely by the logic circuit. Furthermore, the switching circuit 33 performs the switching operation on the basis of the switching signal 78*b* from the auxiliary computing device 32 without failure instead of the signal from the failed main computing device 31. Consequently, the switching circuit 33 can be switched more securely.

According to the motor drive device 30, the auxiliary computing device 32 has a higher priority to control a second control system than the main computing device 31. That is, when signals are input from both the main computing device 31 and the auxiliary computing device 32, the switching circuit 33 adopts the signal from the auxiliary computing device 32 with a higher priority, performs the switching operation, and supplies the second inverter 64B with the drive instruction. Thus, even if an abnormal signal is input from the main computing device 31 to the switching circuit 33 in case the main computing device 31 fails, the switching circuit 33 breaks this signal. Consequently, the second inverter 64B can be normally controlled on the basis of the signal input from the normal auxiliary computing device 32.

2-2. Modified Example

Subsequently, a modified example of the second preferred embodiment is described.

Figure 10:
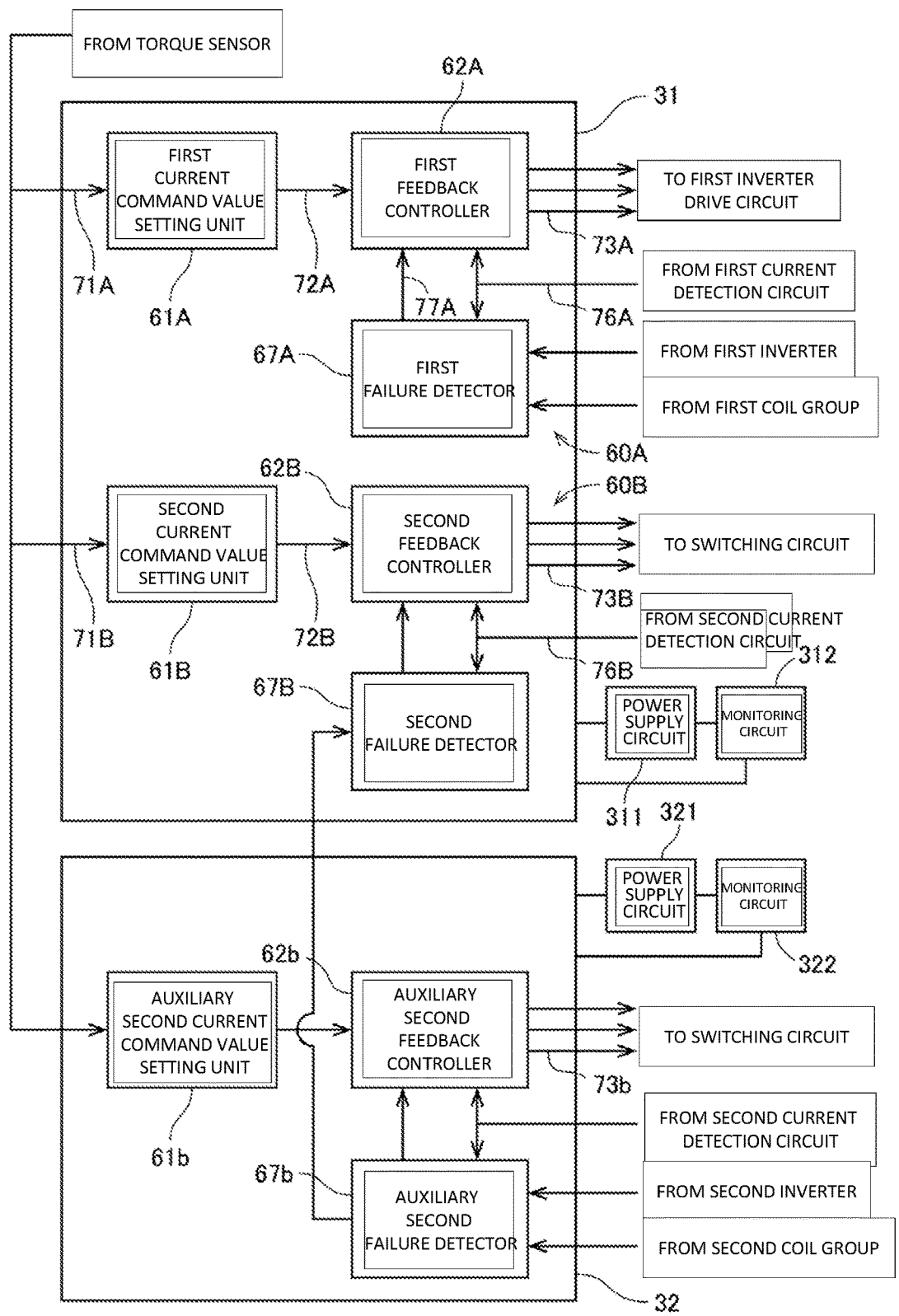
FIG. 10 is a functional block diagram of a main computing device and an auxiliary computing device according to a modified example.

FIG. 10 is a functional block diagram of a main computing device 31 and an auxiliary computing device 32 according to one modified example. In the example in FIG. 10, instead of the monitoring unit 80*b* of the auxiliary computing device 32, a first power source circuit 311 and a first monitoring circuit 312 are provided out of the main computing device 31. The first power source circuit 311 supplies power to the main computing device 31 and the first monitoring circuit 312. The first monitoring circuit 312 monitors presence or absence of a failure in the main computing device 31. The motor drive device 30 in FIG. 10 further includes a second power source circuit 321 and a second monitoring circuit 322 outside of the auxiliary computing device 32. The second power source circuit 321 supplies power to the auxiliary computing device 32 and the second monitoring circuit 322. The second monitoring circuit 322 monitors presence or absence of a failure in the auxiliary computing device 32.

Thus, according to the motor drive device 30 in FIG. 10, the main computing device 31 and the auxiliary computing device are individually provided with the respective power source circuits 311 and 321. Consequently, if one of the two power source circuits 311 and 321 fails but the other power source circuit is normal, driving of the motor 20 can be continued using the computing device supplied with power from the power source circuit.

Figure 11:
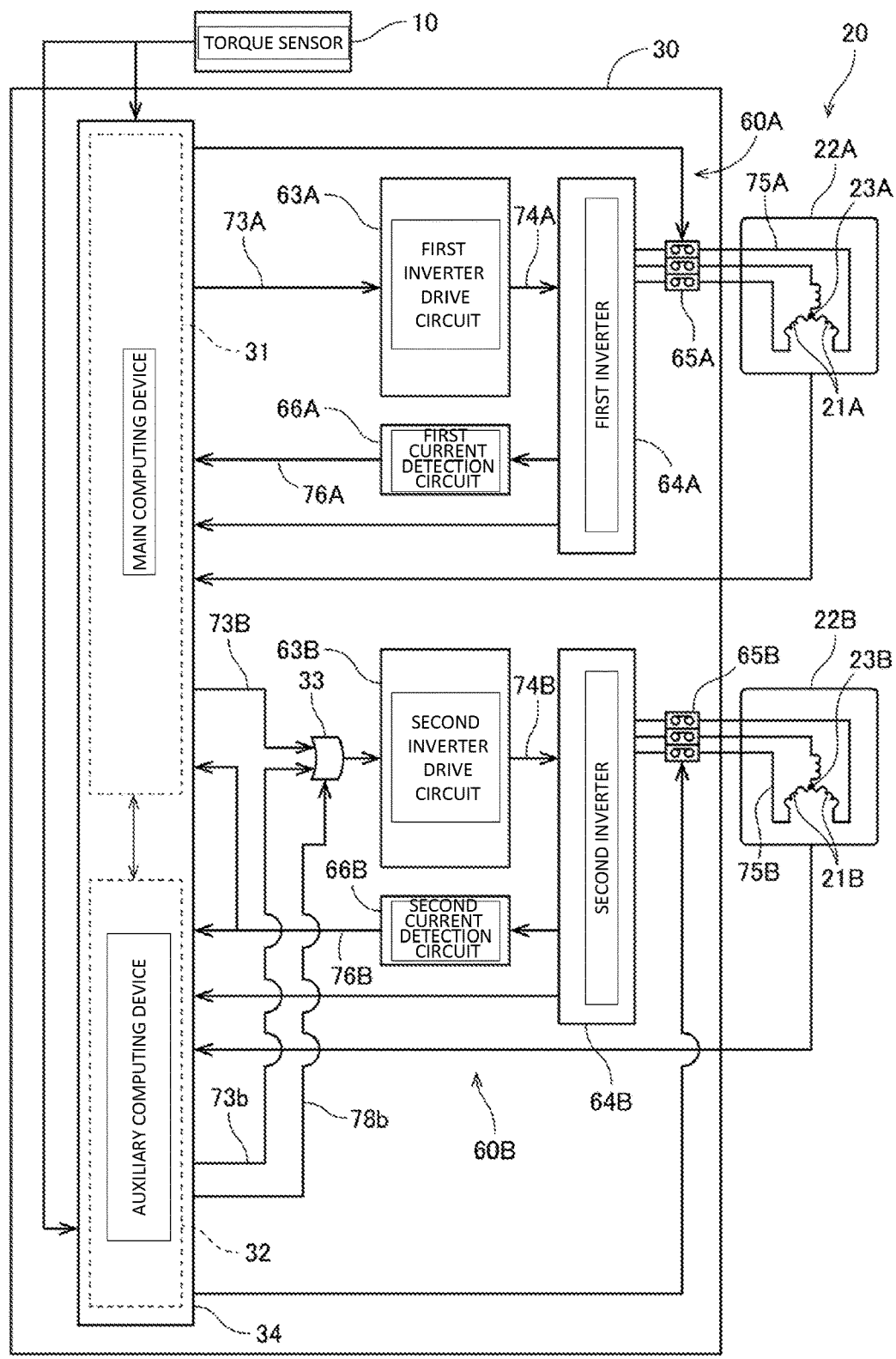
FIG. 11 is a block diagram showing a configuration of a motor drive device according to a modified example.

FIG. 11 is a block diagram showing the configuration of a motor drive device 30 according to another modified example. In the example in FIG. 11, among the electric circuits constituting the motor drive device 30, a single semiconductor element 34 that includes a main computing device 31 and an auxiliary computing device 32 is provided. Such implementation of the main computing device 31 and the auxiliary computing device 32 in the semiconductor element 34, which is a single package, can further reduce the size of the motor drive device 30.

Figure 12:
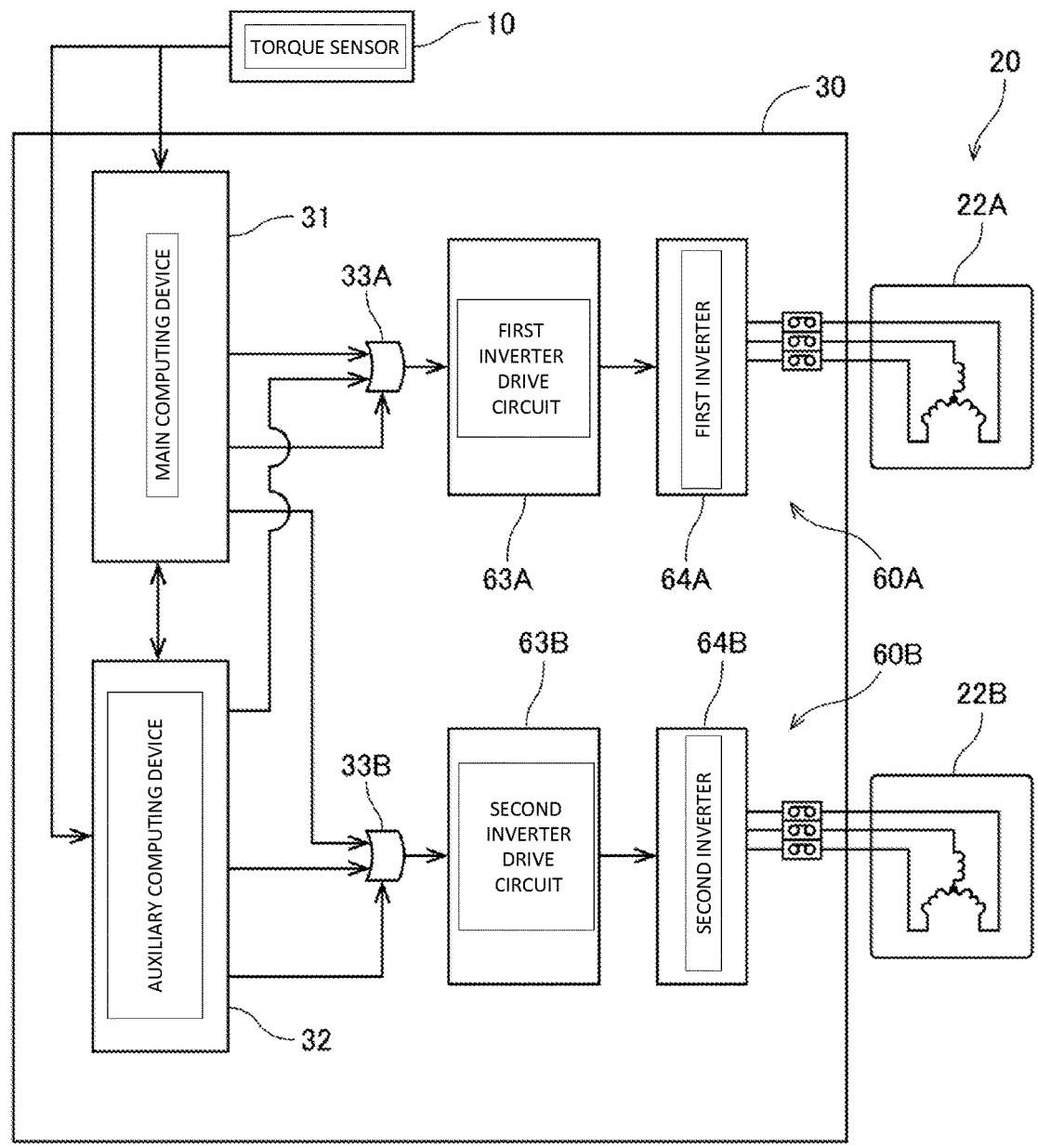
FIG. 12 is a block diagram showing a configuration of a motor drive device according to a modified example.

FIG. 12 is a block diagram showing the configuration of a motor drive device 30 according to another modified example. In FIG. 12, illustration of the detection circuit is omitted in order to avoid complication of the drawing. In the example in FIG. 12, among the electric circuits constituting the motor drive device 30, two switching circuits 33A and 33B are provided. The main computing device 31 is connected to the first inverter drive circuit 63A and the second inverter drive circuit 63B through respective two switching circuits 33A and 33B. The auxiliary computing device 32 is also connected to the first inverter drive circuit 63A and the second inverter drive circuit 63B through the respective switching circuits 33A and 33B.

In case a limited failure where only a terminal for outputting a drive instruction to the inverter drive circuit is fixed in the main computing device 31 occurs, the two switching circuits 33A and 33B are switched to the auxiliary computing device 32 according to the switching signal from the main computing device 31 and the auxiliary computing device 32. Thus, the auxiliary computing device 32 controls both the first control system 60A and the second control system 60B. That is, in the example in FIG. 12, both the first control system 60A and the second control system 60B serve as emergency control systems.

In the example in FIG. 12, the switching circuit 33A connected to the first inverter drive circuit 63A performs the switching operation on the basis of the switching signal from the main computing device 31. Meanwhile, the switching circuit 33B connected to the second inverter drive circuit 63B performs the switching operation on the basis of the switching signal from the auxiliary computing device 32. Thus, such a configuration that controls two or more switching circuits by different computing devices can normally switch at least one switching circuit by a normal computing device even in case any of the computing devices fails. Consequently, at least one control system can be controlled by the normal computing device.

In the second preferred embodiment described above, the motor 20 includes the two coil groups 22A and 22B, and the motor drive device 30 includes the two control systems 60A and 60B corresponding thereto. Alternatively, the motor 20 may include three or more coil groups, and the motor drive device 30 may include three or more control systems corresponding thereto.

That is, in a generalized manner assuming that N is an integer of two or more, the motor 20 may include the first to n-th coil groups. In this case, it is only required that the motor drive device 30 includes the first to N-th control systems that individually supply the drive currents to the respective coil groups. In normal times, the main computing device executes the function of the N-th current command value setting unit from the first current command value setting unit, the function of the N-th controller from the first controller, and the function of the N-th failure detector from the first failure detector. Any integer from 1 to N is assumed as n. It is only required that in case the main computing device fails, the auxiliary computing device executes the functions of the n-th current command value setting unit, the n-th controller, and the n-th failure detector in at least one emergency control system among the first to N-th control systems.

As shown in the example in FIG. 12, two or more emergency control systems are provided among the first to N-th control systems. In this case, the electric circuits constituting the motor drive device may include two or more switching circuits corresponding to two or more emergency control systems. Thus, in case the main computing device fails, the operation of the motor can be continued using the two or more control systems.

In the second preferred embodiment described above, a part of input and output of information into and from the second control system is performed through the auxiliary computing device 32. However, also a part of input and output of information into and from the first control system may be performed through the auxiliary computing device 32. Such a configuration can further reduce the number of terminals of the auxiliary computing device 32. The size of the motor drive device 30 may be reduced by reducing the number of terminals of the auxiliary computing device 32 to be smaller than the number of terminals of the main computing device 31.

The motor drive device 30 may be applied to a device other than the power steering device. For example, a motor used for another site in the transportation apparatus may be driven by the motor drive device 30. A motor mounted in an apparatus other than an automobile, such as an industrial robot, may be driven by the motor drive device 30 described above.

The detailed configuration of the motor drive device may be different from the configuration described in each diagram shown in the present application. For example, a part of the function of the computing device may be realized by an electric circuit. The elements recited in the preferred embodiment or modified example described above may be appropriately combined in a range without causing contradiction.

INDUSTRIAL APPLICABILITY

The present invention can be used for the motor drive device and the electric power steering device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor drive device for driving a motor, comprising an electric circuit that includes first to N-th control systems that individually supply drive currents to respective first to N-th coil groups included in the motor, wherein each of the N-th control systems respectively includes:
an n-th inverter that supplies the n-th coil group with the drive current;
n-th current command value setting circuitry that sets an n-th current command value according to an input signal from an outside;
an n-th controller that supplies at least one drive instruction to a drive circuit of the n-th inverter, based on the n-th current command value; and
an n-th failure detector that detects a failure in the n-th inverter or the n-th coil group,
N is an integer of two or more, and n is any integer from 1 to N,
when the n-th failure detector detects the failure, an operation of the n-th control system is stopped or is caused to fall back,
the electric circuit includes a main computing device and an auxiliary computing device that perform a computational process, based on a preset program,
the main computing device executes a function of N-th current command value setting circuitry from the first current command value setting circuitry, a function of the N-th controller from the first controller, and a function of the N-th failure detector from the first failure detector,
when the main computing device fails, the auxiliary computing device executes the functions of the n-th current command value setting circuitry, the n-th controller, and the n-th failure detector in at least one emergency control system among the first to N-th control systems, and
together, the main computing device and the auxiliary computing device provide a total of N+1 drive instruction outputs which are used in controlling all of the n-th inverters.

2. The motor drive device according to claim 1,
wherein the electric circuit includes a switching circuit that connects the main computing device and the auxiliary computing device, in an alternative manner, to the n-th inverter.

3. The motor drive device according to claim 2,
wherein the switching circuit switches connection, based on a switching signal from the auxiliary computing device.

4. The motor drive device according to claim 2,
wherein the first to N-th control systems include two or more emergency control systems,
the electric circuit includes two or more switching circuits corresponding to the respective two or more emergency control systems.

5. The motor drive device according to claim 1,
wherein the auxiliary computing device has a higher priority to control any of the control systems than the main computing device.

6. The motor drive device according to claim 1,
the main computing device performs a part of input and output of information into and from the first to N-th control systems through the auxiliary computing device, and
the number of terminals of the main computing device is identical to the number of terminals of the auxiliary computing device.

7. The motor drive device according to claim 1,
wherein the number of terminals of the auxiliary computing device is smaller than the number of terminals of the main computing device.

8. The motor drive device according to claim 1,
wherein the auxiliary computing device includes monitoring circuitry that monitors presence or absence of the failure in the main computing device.

9. The motor drive device according to claim 8,
wherein when the main computing device normally operates, the auxiliary computing device does not control any of the first to N-th control systems.

10. The motor drive device according to claim 1,
wherein the electric circuit further includes a monitoring circuit that monitors presence or absence of the failure in the main computing device.

11. The motor drive device according to claim 1,
wherein the electric circuit includes:
   a first power source circuit that supplies power to the main computing device; and
   a second power source circuit that supplies power to the auxiliary computing device.

12. The motor drive device according to claim 1,
wherein the electric circuit comprises a single semiconductor element that includes the main computing device and the auxiliary computing device.

13. An electric power steering device for assisting a driver in steering, comprising:
   a torque sensor that detects a torque by the steering;
   a motor drive device including:
      an electric circuit that includes first to N-th control systems that individually supply drive currents to respective first to N-th coil groups included in the motor, wherein
      each of the N-th control systems respectively includes:
         an n-th inverter that supplies the n-th coil group with the drive current;
         n-th current command value setting circuitry that sets an n-th current command value according to an input signal from an outside;
         an n-th controller that supplies at least one drive instruction to a drive circuit of the n-th inverter, based on the n-th current command value; and
         an n-th failure detector that detects a failure in the n-th inverter or the n-th coil group; and
   a motor driven by the motor drive device, wherein
   N is an integer of two or more, and n is any integer from 1 to N,
   when the n-th failure detector detects the failure, an operation of the n-th control system is stopped or is caused to fall back,
   the electric circuit includes a main computing device and an auxiliary computing device that perform a computational process, based on a preset program,
   the main computing device executes a function of N-th current command value setting circuitry from the first current command value setting circuitry, a function of the N-th controller from the first controller, and a function of the N-th failure detector from the first failure detector,
   when the main computing device fails, the auxiliary computing device executes the functions of the n-th current command value setting circuitry, the n-th controller, and the n-th failure detector in at least one emergency control system among the first to N-th control systems,
   together, the main computing device and the auxiliary computing device provide a total of N+1 drive instruction outputs which are used in controlling all of the n-th inverters; and
   the n-th current command value setting circuitry sets the n-th current command value according to a torque signal input from the torque sensor.

* * * * *